March 7, 1967 P. G. SALERNO 3,307,786
MODULATING INLINE VALVE
Filed Sept. 17, 1965 2 Sheets-Sheet 1

INVENTOR
PAUL G. SALERNO
BY *Norman A. Witt*
ATTORNEY

March 7, 1967 P. G. SALERNO 3,307,786
MODULATING INLINE VALVE
Filed Sept. 17, 1965 2 Sheets-Sheet 2

INVENTOR
PAUL G. SALERNO
BY
ATTORNEY

United States Patent Office 3,307,786
Patented Mar. 7, 1967

3,307,786
MODULATING INLINE VALVE
Paul G. Salerno, Glenview, Ill., assignor to Vapor Corporation, Chicago, Ill., a corporation of Illinois
Filed Sept. 17, 1965, Ser. No. 487,971
10 Claims. (Cl. 236—80)

This invention relates to a modulating inline valve for controlling fluid flow through a conduit or pipe line, and more particularly to a modulating inline valve that is operably responsive to the condition of the fluid flowing therethrough when in open position, and still more particularly to a modulating inline valve for controlling air flow through a conduit or pipe line.

Heretofore, inline valves have been employed for controlling air flow operation through conduits or pipe lines, and which were capable of providing open or closed operation so as to shut off the air flow when desired. Further, such inline valves have been modified to include a pilot valve for limiting the maximum open position. However, it has not been heretofore possible to control operation of the pilot valve in accordance with the condition of the fluid flowing through the valve.

Therefore, it is an object of the present invention to provide a new and improved modulating inline valve for controlling fluid flow operation through conduits or pipe lines.

Another object of this invention is in the provision of a modulating inline valve capable of responding to a condition of the fluid flowing therethrough to modulate the fluid flow.

Still another object of this invention is to provide a modulating inline valve capable of modulating fluid flow therethrough in response to the pressure of the fluid.

A further object of this invention is in the provision of a modulating inline valve capable of modulating fluid flow therethrough in response to the temperature of the fluid.

Other objects, features and advantages of the invention will be apparent from the following detailed disclosure, taken in conjunction with the accompanying sheets of drawings wherein like reference numerals refer to like parts, in which:

FIGS. 3–6 are provided to clarify the operation of the present invention wherein FIGS. 3 and 4 are diagrammatic views of an inline shut-off valve and FIGS. 5 and 6 diagrammatic views of an inline shut-off valve with a pilot valve.

Figures 1, 2:
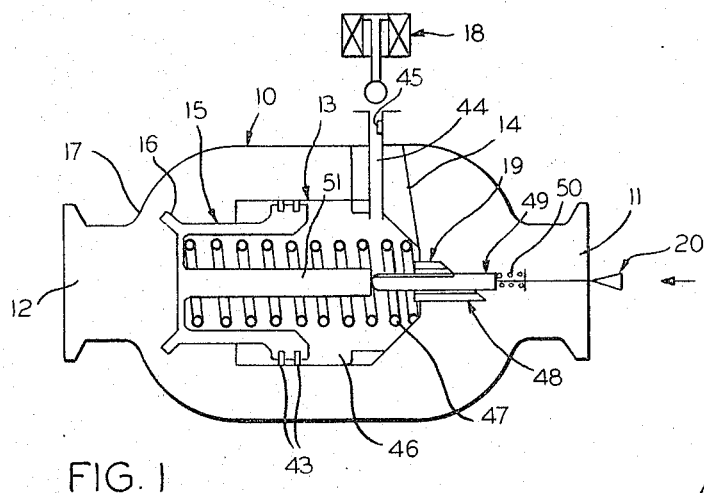
FIG. 1 is a diagrammatic view of the modulating inline valve in accordance with the present invention.
FIG. 2 is a greatly enlarged perspective exploded view of the pilot valve employed in the embodiment of FIG. 1.

Referring now to the drawings, and particularly to FIGS. 1 and 2, the modulating inline valve of the present invention includes generally a tubular casing 10 having an inlet 11 and an outlet 12, a cylindrical shell 13 supported within the casing by a supporting member 14 in axial alignment with the inlet and outlet, a piston 15 axially and slidably received within the shell 13 and having a valve closure means 16 on the end adjacent to the outlet 12 coacting with a valve seat 17 formed on the casing 10, a solenoid control valve 18 for controlling the pressure within the shell 13, a pilot valve 19, and a fluid condition responsive means 20 for adjusting the pilot valve 19. In order to most clearly understand the modulating inline valve of the present invention, reference will be made to the inline shut-off valve of FIGS. 3 and 4, and as modified with a pilot valve as in FIGS. 5 and 6.

Figure 3:
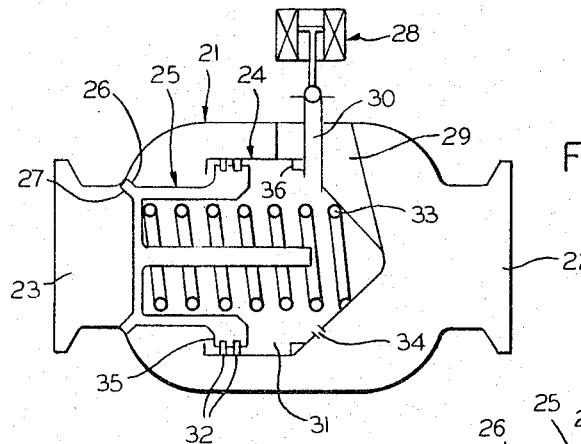
Figure 4:
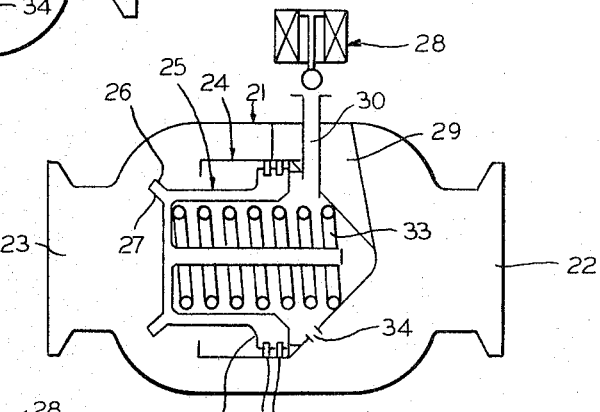

Referring now to the inline shut-off valve shown in FIGS. 3 and 4, this valve includes a tubular casing 21 having an inlet 22 and an outlet 23, a shell 24 within the casing extending axially and in alignment with the inlet and outlet, a piston 25 axially and slidably received in the shell 24 and having at one end a valve closure means 26 adapted to coact with a valve seat 27 at the outlet 23 for shut-off operation, and a solenoid control valve 28. The shell 24 is supported by a support means 29 having a vent 30 extending therethrough and into the pressure chamber 31 of the shell. The shell is closed at the end adjacent to the inlet and open at the end adjacent to the outlet and through which the piston 25 extends. The solenoid valve 28 either opens the vent 30 to atmosphere or closes same from the atmosphere.

The piston 25 is provided with air sealing rings 32 coacting with the shell 24 to minimize air leakage between the piston and the shell, and a compression spring 33 urges the piston 25 toward the outlet 23 and the valve closure means 26 into sealing engagement with the valve seat 27 to close the flow of air or fluid between the inlet and outlet.

With the solenoid valve 28 in closed position as shown in FIG. 3, the pressure in the piston chamber 31 is equal to the pressure at the valve inlet 32 because of the bleed orifice 34 in the shell that permits flow of inlet pressure into the pressure chamber 31 until the pressure becomes equal to the inlet pressure. Further, some leakage through the sealing rings 32 also causes the pressure to equalize. Piston pressure against the inner side of the piston, together with the force of the spring 33 causes the valve to close. Upon opening of the solenoid valve 28, the pressure in the piston chamber 31 decreases, and the inlet pressure acting on the piston at 35 overcomes the force of the spring 33 and causes the valve to open, since the piston area is larger than the disc area on the valve closure means 26. Thus the inlet pressure causes the valve to open until the piston assembly strikes a mechanical stop 36 as shown in FIG. 4.

Figure 5:
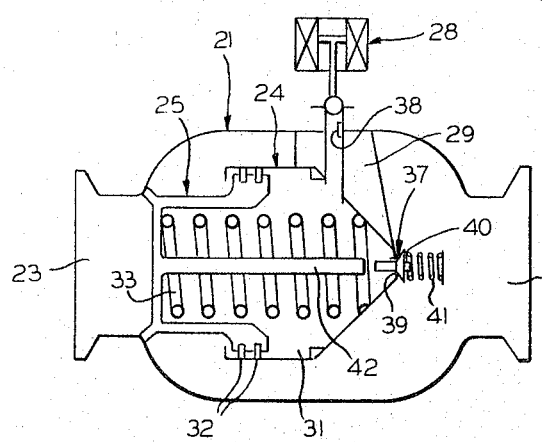
Figure 6:
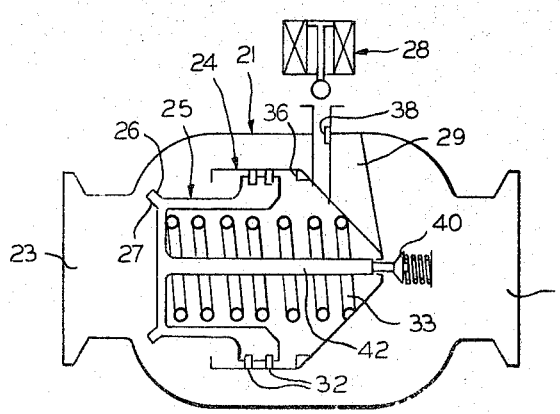

The present invention provides for opening of the inline valve to intermediate positions, which is best illustrated initially in FIGS. 5 and 6, this embodiment differing from the embodiment of FIGS. 3 and 4 in that a pilot valve 37 is provided in place of the bleed orifice 34, and a restriction 38 is arranged in the vent 30. Otherwise, the parts in the valve of FIGS. 5 and 6 are the same as in FIGS. 3 and 4, and like references are applied to like parts. The pilot valve 37 includes an opening and valve seat 39 in the shell, and a movable valve closure member 40 normally biased into closed engaging position with the valve seat 39 by a spring 41 when the valve is closed as shown in FIG. 5. The pilot valve is open when a rod 42 provided on the piston 25 hits the movable valve member 40, as shown in FIG. 6, to open the pilot valve 37 against the force of the spring 41. As noted in FIG. 6, opening of the pilot valve 37 occurs prior to engagement of the stop 36 by the piston 25.

When the solenoid valve 28 is closed as shown in FIG. 5, the valve closes in exactly the same way as in the embodiment of FIGS. 3 and 4, except that equalization of pressure between the inlet and the piston chamber 31 occurs exclusively by leakage through the sealing rings 32 since there is no orifice present. If it were possible to have perfect sealing rings, the pilot valve could be designed to have a slight leakage even in the closed position so that equalization of piston pressure and inlet pressure could occur. Of course, any other suitable arrangement could be employed to provide pressure equalization. When the solenoid valve 28 is opened, as seen in FIG. 6, the valve starts to open with the piston 25 moving toward the inlet end of the valve, but the motion of the piston assembly is arrested as soon as the rod 42 strikes the movable valve 40 of the pilot valve 47 since such causes a rapid rise in pressure within the piston chamber 31 as soon as the pilot valve starts to open. The restriction 38 may be used to allow the piston pressure to increase if so desired. Any external force which would tend to move the piston assembly would be resisted either by a rise or fall in piston pressure. Moreover, it can be appreciated that in the assembly of FIGS. 5 and 6, the piston assembly can move to only one position, that being the position where the pilot valve starts to open. For control purposes, it is necessary to move the valve closure means 26 to any position as dictated by a suitable signal. The present invention accomplishes the control desired by providing a modified pilot valve 19. Referring now again to FIGS. 1 and 2, the piston 15 includes sealing rings 43 for controlling leakage between the piston and the shell, and a vent 44 having a restriction 45 therein for coacting with the solenoid valve 18 to open or close the piston chamber 46 to atmosphere or ambient pressure. A spring 47 serves to normally drive the piston 15 toward the outlet 12 so that the valve closure means 16 engages the valve seat 17.

The pilot valve 19 includes a tubular member 48 suitably supported in the closed end of the shell 13, and a movable member 49 biased by a spring 50 toward the outlet 12 and in engagement with a rod 51 of the piston.

The tubular stationary member 48 of the pilot valve includes an inner end 52 having an edge arranged in a transverse plane, and an outer end 53 having a generally spherically spaced edge facing the inlet 11. The inner end extends within the pressure chamber 46. The outer end 53 includes an upper flat portion 54, a lower flat portion 55, and an inclined ramp section 56. The upper and lower flat sections extend through planes normal to the axis of the tubular member, and together with the ramp section 56 define substantially a complete revolution or about 360° of arcuate extent. The end 54a of the upper flat section 54 emerges with the end 56a of the ramp section 56, while the end 56b of the ramp section merges with the end 55a of the lower flat section. While the upper and lower flat sections and the ramp section have an arcuate extent of about 360°, it should be appreciated that it could be less than that amount if so desired.

The movable member 49 of the pilot valve is essentially cylindrical in shape with its inner end being spherically shaped at 57 to provide engagement with the rod 51 of the piston 15, and an elongated axially extending groove or slot 58 extends through one side of the member 49 and coacts with the outer end 53 during the movement of this movable member toward open position. As can be appreciated, rotation of the movable member 49 will align the groove 58 along the flat or ramp sections of the tubular member 48. When the movable member 49 is positioned within the tubular member 48 so that the groove 58 is entirely within the tubular member 48, the pilot valve is closed, and when the groove appears outside the tubular member 48 so that air can pass along the groove 58 and over the outer end 53 of the tubular member, the pilot valve is open. Therefore, it can be appreciated that by rotating the grooved movable member to different angular positions, the pilot valve will open at different linear displacements of the movable member 49. For example, the pilot valve opens with a small displacement if the groove 58 on the movable member 49 is aligned with the flat lower portion 55. Larger displacements of the movable member are required to open the pilot valve as the groove 58 is aligned along the ramp section 56, and maximum displacement of the movable member 49 is required when the groove 58 is aligned anywhere along the upper flat section 54.

If the fluid condition responsive means 20 is desired to be pressure responsive, it can take the form of a pressure regulator for rotation of the movable member 49, and if it is desired to be temperature responsive, it can take the form of a bimetal actuator to rotate the movable member 49 of the pilot valve 19.

It will be understood that modifications and variations may be effected without departing from the scope of the novel concepts of the present invention, but it is understood that this application is to be limited only by the scope of the appended claims.

The invention is hereby claimed as follows:

1. A modulating inline valve comprising, a tubular casing having an inlet and an outlet axially aligned therewith, a cylindrical shell supported within said casing and axially aligned with said inlet and outlet, the end of the shell adjacent the inlet being closed and the end thereof adjacent the outlet being open, a piston axially and slidably received in said shell, a seat at said outlet, valve closure means on said piston adapted to coact with said seat to close said outlet, spring means normally biasing said piston toward said outlet and said valve closure means to seated position, means for selectively venting said shell to control movement of said valve closure means between open and closed positions, a pilot valve in said shell for limiting the maximum opening of said valve closure means, and means adjacent the inlet responsive to the condition of the fluid flowing therethrough to adjust the pilot valve for varying the maximum opening of said valve closure means.

2. A modulating inline valve comprising, a tubular casing having an inlet and an outlet axially aligned therewith, a cylindrical shell supported within said casing and axially aligned with said inlet and outlet, the end of the shell adjacent the inlet being closed and the end thereof adjacent the outlet being open, a piston axially and slidably received in said shell, a seat at said outlet, valve closure means on said piston adapted to coact with said seat to close said outlet, spring means normally biasing said piston toward said outlet and said valve closure means to seated position, means for selectively venting said shell to control movement of said valve closure means between open and closed positions, a pilot valve in said shell for limiting the maximum opening of said valve closure means, and pressure means adjacent the inlet responsive to the condition of the fluid flowing therethrough to adjust the pilot valve for varying the maximum opening of said valve closure means.

3. A modulating inline valve comprising, a tubular casing having an inlet and an outlet axially aligned therewith, a cylindrical shell supported within said casing and axially aligned with said inlet and outlet, the end of the shell adjacent the inlet being closed and the end thereof adjacent the outlet being open, a piston axially and slidably received in said shell, a seat at said outlet, valve closure means on said piston adapted to coact with said seat to close said outlet, spring means normally biasing said piston toward said outlet and said valve closure means to seated position, means for selectively venting said shell to control movement of said valve closure means between open and closed positions, a pilot valve in said shell for limiting the maximum opening of said valve closure means, and temperature means adjacent the inlet responsive to the condition of the fluid flowing therethrough to adjust the pilot valve for varying the maximum opening of said valve closure means.

4. A modulating inline valve comprising, a tubular casing having an inlet and an outlet axially aligned therewith, a cylindrical shell supported within said casing and axially aligned with said inlet and outlet, the end of the shell adjacent the inlet being closed and the end thereof adjacent the outlet being open, a piston axially and slidably received in said shell, a seat at said outlet, valve closure means on said piston adapted to coact with said seat to close said outlet, spring means normally biasing said piston toward said outlet and said valve closure means to seated position, means for selectively venting said shell to control movement of said valve closure means between open and closed positions, a pilot valve in said shell for limiting the maximum opening of said valve closure means, and means adjacent the inlet responsive to the condition of the fluid flowing therethrough to adjust the pilot valve for varying the maximum opening of said valve closure means, said fluid responsive means including a pressure regulator.

5. A modulating inline valve comprising, a tubular casing having an inlet and an outlet axially aligned therewith, a cylindrical shell supported within said casing and axially aligned with said inlet and outlet, the end of the shell adjacent the inlet being closed and the end thereof adjacent the outlet being open, a piston axially and slidably received in said shell, a seat at said outlet, valve closure means on said piston adapted to coact with said seat to close said outlet, spring means normally biasing said piston toward said outlet and said valve closure means to seated position, means for selectively venting said shell to control movement of said valve closure means between open and closed positions, a pilot valve in said shell for limiting the maximum opening of said valve closure means, and means adjacent the inlet responsive to the condition of the fluid flowing therethrough to adjust the pilot valve for varying the maximum opening of said valve closure means, said fluid responsive means including a bimetal temperature actuator.

6. A modulating inline valve comprising, a tubular casing having an inlet and an outlet axially aligned therewith, a cylindrical shell supported within said casing and axially aligned with said inlet and outlet, the end of the shell adjacent the inlet being closed and the end thereof adjacent the outlet being open, a piston axially and slidably received in said shell, a seat at said outlet, valve closure means on said piston adapted to coact with said seat to close said outlet, spring means normally biasing said piston toward said outlet and said valve closure means to seated position, means for selectively venting said shell to control movement of said valve closure means between open and closed positions, a pilot valve in said shell for limiting the maximum opening of said valve closure means, and means adjacent the inlet responsive to the condition of the fluid flowing therethrough to adjust the pilot valve for varying the maximum opening of said valve closure means, said pilot valve including a tubular member having at the end extending outside of the shell a generally spiral shaped end, and a rod movable within said member having an axially extending groove along one side coacting with said spiral shaped end to control the pressure within said shell and the maximum opening of said valve closure means, and means on said piston engaging said rod and moving same upon opening of the valve.

7. A modulating inline valve comprising, a tubular casing having an inlet and an outlet axially aligned therewith, a cylindrical shell supported within said casing and axially aligned with said inlet and outlet, the end of the shell adjacent the inlet being closed and the end thereof adjacent the outlet being open, a piston axially and slidably received in said shell, a seat at said outlet, valve closure means on said piston adapted to coact with said seat to close said outlet, spring means normally biasing said piston toward said outlet and said valve closure means to seated position, means for selectively venting said shell to control movement of said valve closure means between open and closed positions, a pilot valve in said shell for limiting the maximum opening of said valve closure means, and means adjacent the inlet responsive to the condition of the fluid flowing therethrough to adjust the pilot valve for varying the maximum opening of said valve closure means, said pilot valve including a tubular member having at the end extending outside of the shell an edge having an upper flat section, a lower flat section and a connecting ramp section, and a rod movable within said member having an axially extending groove along one side coacting with said edge to control the fluid pressure within said shell and the maximum opening of said valve closure means, and means on said piston engaging said rod and moving same upon opening of the valve.

8. A modulating inline valve comprising, a tubular casing having an inlet and an outlet axially aligned therewith, a cylindrical shell supported within said casing and axially aligned with said inlet and outlet, the end of the shell adjacent the inlet being closed and the end thereof adjacent the outlet being open, a piston axially and slidably received in said shell, a slat at said outlet, valve closure means on said piston adapted to coact with said seat to close said outlet, spring means normally biasing said piston toward said outlet and said valve closure means to seated position, means for selectively venting said shell to control movement of said valve closure means between open and closed positions, a pilot valve in said shell for limiting the maximum opening of said valve closure means, and means adjacent the inlet responsive to the condition of the fluid flowing therethrough to adjust the pilot valve for varying the maximum opening of said valve closure means, said pilot valve including a tubular member having at the end extending outside of the shell an edge having an upper flat section, a lower flat section and an inclined ramp section interconnecting one end of said upper flat section with one end of said lower flat section, a rod movable within said member having an axially extending groove along one side coacting with said edge to control the fluid pressure within said shell and the maximum opening of said valve closure means, and means on said piston engaging said rod and moving same upon opening of the valve.

9. A modulating inline valve comprising, a tubular casing having an inlet and an outlet axially aligned therewith, a cylindrical shell supported within said casing and axially aligned with said inlet and outlet, the end of the shell adjacent the inlet being closed and the end thereof adjacent the outlet being open, a piston axially and slidably received in said shell, a seat at said outlet, valve closure means on said piston adapted to coact with said seat to close said outlet, spring means normally biasing said piston toward said outlet and said valve closure means to seated position, means for selectively venting said shell to control movement of said valve closure means between open and closed positions, a pilot valve in said shell for limiting the maximum opening of said valve closure means, and means adjacent the inlet responsive to the condition of the fluid flowing therethrough to adjust the pilot valve for varying the maximum opening of said valve closure means, said pilot valve including a tubular member having at the end extending outside of the shell an edge having an upper flat section, a lower flat section and an inclined ramp section interconnecting one end of said upper flat section with one end of said lower flat section, a rod movable within said member having an axially extending groove along one side coacting with said edge to control the fluid pressure within said shell and the maximum opening of said valve closure means, means on said piston engaging said rod and moving same upon opening of the valve, and means interconnecting said rod and fluid responsive means to rotate said rod relative to said tubular member depending upon the fluid condition.

10. The combination as defined in claim 7, wherein the arcuate extent of said flat and ramp sections equals approximately 360°.

References Cited by the Examiner
UNITED STATES PATENTS

| | | | |
|---|---|---|---|
| 668,766 | 2/1901 | Bickel | 236—80 X |
| 2,200,318 | 5/1940 | Yonkers | 236—80 |
| 2,400,911 | 5/1946 | Booth | 236—80 X |
| 2,581,956 | 1/1952 | Jones | 236—80 X |

WILLIAM J. WYE, *Primary Examiner.*